United States Patent
Bergmann et al.

(10) Patent No.: US 9,618,973 B2
(45) Date of Patent: Apr. 11, 2017

(54) MECHANICALLY EMBEDDED HEATING ELEMENT

(71) Applicant: Intel Corporation, Santa Clara, CA (US)

(72) Inventors: Remi Bergmann, Tampere (FI); Erkki Nokkonen, Tampere (FI); Juha Paavola, Tampere (FI); Hannu Luoma, Tampere (FI); Kari Vallius, Tampere (FI)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/752,695

(22) Filed: Jun. 26, 2015

(65) Prior Publication Data

US 2016/0378140 A1    Dec. 29, 2016

(51) Int. Cl.
| | |
|---|---|
| G06F 1/16 | (2006.01) |
| H05B 3/00 | (2006.01) |
| B32B 7/00 | (2006.01) |
| H05B 3/86 | (2006.01) |
| B32B 7/12 | (2006.01) |
| B32B 7/06 | (2006.01) |

(52) U.S. Cl.
CPC ............ *G06F 1/1637* (2013.01); *B32B 7/06* (2013.01); *B32B 7/12* (2013.01); *H05B 3/0014* (2013.01); *H05B 3/86* (2013.01)

(58) Field of Classification Search
CPC .... B32B 3/10; B32B 7/06; B32B 5/24; B32B 7/045; B32B 7/12; B32B 37/12
USPC ............................................ 156/272.2, 274.2
See application file for complete search history.

(56) References Cited

U.S. PATENT DOCUMENTS

| | | | | |
|---|---|---|---|---|
| 3,438,843 A | * | 4/1969 | Pagel | C09J 7/00 156/179 |
| 5,025,602 A | * | 6/1991 | Baughman | E06B 3/6722 349/16 |
| 5,216,326 A | * | 6/1993 | Lundgren | H01J 29/003 315/8 |
| 5,243,162 A | * | 9/1993 | Kobayashi | H01H 13/702 200/5 A |

(Continued)

FOREIGN PATENT DOCUMENTS

WO    2014-029062 A1    2/2014

OTHER PUBLICATIONS

International Search Report and Written Opinion received for International Application No. PCT/US2016/035088, mailed on Aug. 24, 2016, 12 pages.

(Continued)

*Primary Examiner* — Adrian S Wilson
(74) *Attorney, Agent, or Firm* — Alpine Technology Law Group LLC

(57) ABSTRACT

Methods and apparatus relating to provision and/or utilization of a mechanically embedded heating element are described. An embodiment includes a heating element which is thermally coupled to an adhesive. The adhesive bonds a first item and a second item. The heating element is capable of being heated in response to application of power and the heated heating element causes the release of a bond by the adhesive to allow for physical separation of the first item and the second item. Other embodiments are also disclosed and claimed.

23 Claims, 8 Drawing Sheets

(56) References Cited

U.S. PATENT DOCUMENTS

| | | | | |
|---|---|---|---|---|
| 5,343,111 | A * | 8/1994 | Miwa | H01J 29/003 313/313 |
| 6,284,086 | B1 * | 9/2001 | Cardellino | B29C 65/1687 156/273.7 |
| 7,271,769 | B2 * | 9/2007 | Asano | G06F 1/1616 343/700 MS |
| 7,545,629 | B1 | 6/2009 | Bauer et al. | |
| 7,548,428 | B2 * | 6/2009 | Lev | G06F 1/203 165/104.26 |
| 7,901,532 | B2 * | 3/2011 | Bain | B29C 65/76 156/247 |
| 8,222,089 | B2 | 7/2012 | Choi et al. | |
| 2002/0134543 | A1 * | 9/2002 | Estes | B32B 7/04 165/277 |
| 2002/0152769 | A1 * | 10/2002 | Vehmas | C03B 23/0258 65/104 |
| 2002/0170317 | A1 * | 11/2002 | Vehmas | C03B 23/0258 65/104 |
| 2004/0257283 | A1 * | 12/2004 | Asano | H01Q 1/243 343/702 |
| 2006/0010795 | A1 * | 1/2006 | Ohara | B32B 17/10036 52/204.5 |
| 2006/0061512 | A1 * | 3/2006 | Asano | G06F 1/1616 343/702 |
| 2008/0049949 | A1 * | 2/2008 | Snider | H04B 1/082 381/86 |
| 2009/0183819 | A1 * | 7/2009 | Matsuhira | B32B 37/12 156/99 |
| 2010/0103641 | A1 * | 4/2010 | Cho | H01L 51/5246 361/829 |
| 2010/0175829 | A1 | 7/2010 | Masuda et al. | |
| 2010/0238621 | A1 * | 9/2010 | Tracy | B29C 45/14639 361/679.27 |
| 2012/0244343 | A1 * | 9/2012 | Stiehl | C09J 5/06 428/332 |
| 2012/0268881 | A1 * | 10/2012 | Bergeron | B29C 63/02 361/679.26 |
| 2012/0299841 | A1 * | 11/2012 | Tang | H01Q 1/1271 345/173 |
| 2013/0020031 | A1 | 1/2013 | Fujita et al. | |
| 2014/0111929 | A1 | 4/2014 | Andre et al. | |
| 2014/0252779 | A1 | 9/2014 | Toivanen | |
| 2014/0272332 | A1 * | 9/2014 | Reineman | B32B 7/06 428/201 |
| 2015/0000838 | A1 | 1/2015 | Khachatryan | |
| 2015/0083341 | A1 | 3/2015 | Everaerts et al. | |
| 2015/0085429 | A1 * | 3/2015 | Memering | G06F 1/16 361/679.01 |
| 2016/0279862 | A1 | 9/2016 | Larsen et al. | |

OTHER PUBLICATIONS

International Search Report and Written Opinion received for International Application No. PCT/US2016/018514, mailed on Jun. 1, 2016, 14 pages.

Office Action received for U.S. Appl. No. 14/671,760, mailed on Sep. 26, 2016, 6 pages.

Hong, et al. "Characteristics of Printed Thin Films Using Indium Tin Oxide (ITO) Ink", Materials Transactions, Aug. 25, 2010, pp. 1905 to 1908, vol. 51, No. 10., The Japan Institute of Metals.

Hwang, et al. "Inkjet-Printing of Indium Tin Oxide (ITO) Films for Transparent Conduction Electrodes", Materials Science and Engineering, May 22, 2011, pp. 1128-1131, Elsevier.

* cited by examiner

MECHANICALLY EMBEDDED HEATING ELEMENT

FIELD

The present disclosure generally relates to the field of electronics. More particularly, an embodiment relates to provision and/or utilization of a mechanically embedded heating element.

BACKGROUND

Mobile computing devices are quickly becoming commonplace, e.g., due to their increased battery life as well as improved computing capabilities. One current trend in tablet (or smartphone) design is to permanently bond the display assembly to the chassis with glue. This may minimize the use of fasteners, holes, and/or screws, and enhance the overall system aesthetic. Such design solutions can, however, limit the upgrade and/or serviceability of mobile computing devices.

Application of external heat, e.g., together with some special tools, may be used to pry open such devices. However, application of external heat and/or special tools may require an operator with significant prior knowledge about tearing down such devices, e.g., to ensure no brakeage or damage to the device during the tear down.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
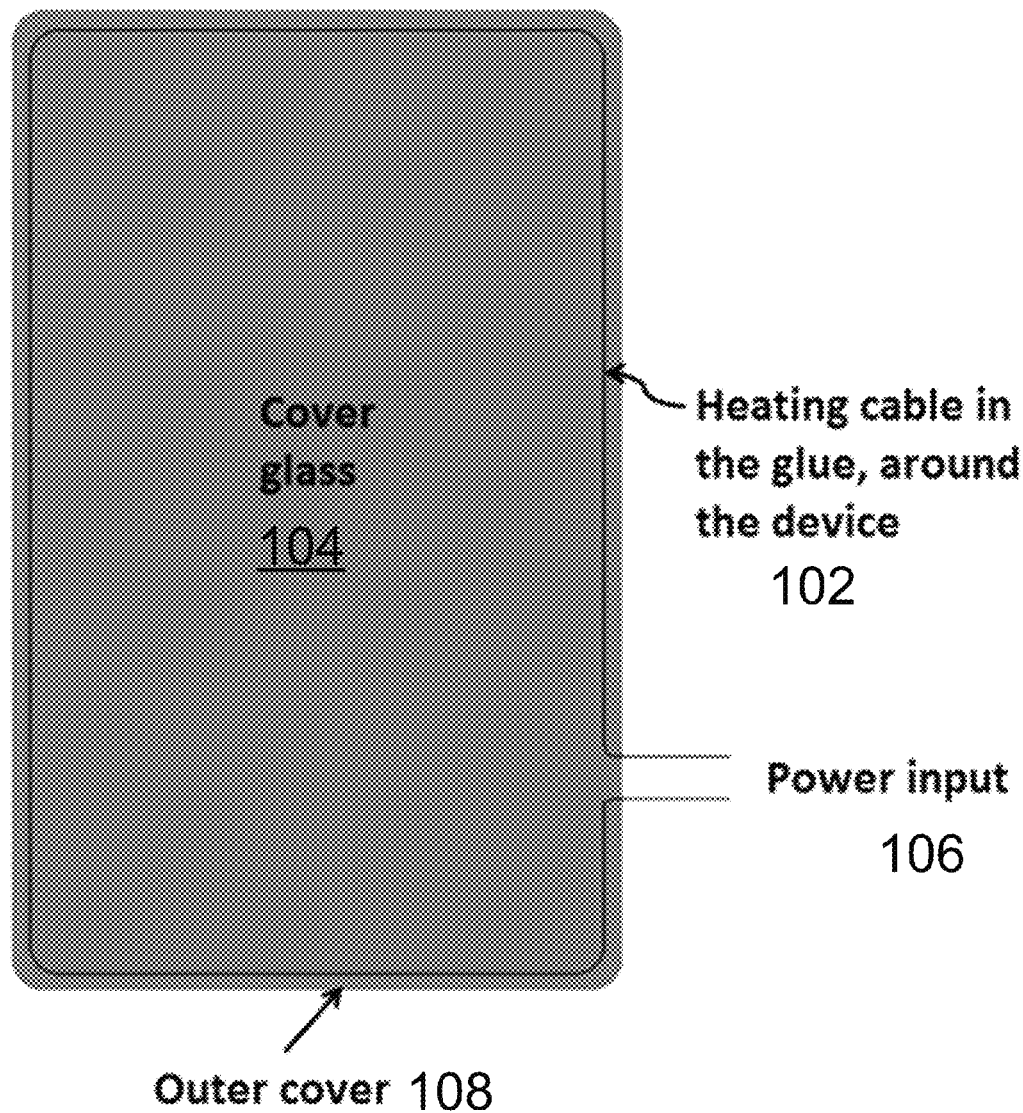
FIG. 1 illustrates a top view of a tablet device according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As mentioned above, in many devices some components are glued together for mechanical and environmental durability. This makes them very difficult to disassemble and service. Moreover, many glues need to be heated in order for it to release and the heat required often has a negative impact on the components that are glued. Some of these glues also require heat to be cured, which can also cause damage to sensitive electronic components. For example, a display module (or display glass) may be glued to a mechanical frame and the only way to access the (e.g., internal) components of the computing device after assembly may be to first remove the display module. However, the display module can be very heat sensitive (e.g., maximum 65° C.) and heat has to be applied through the cover glass and display in order for the glue to release (e.g., minimum 80° C.). Very often this results in a damaged display, which is very expensive.

By contrast, some embodiments provide techniques for provision and/or utilization of a mechanically embedded heating element to disassemble and/or repair computing devices. For example, an embodiment embeds a heat source in the glue or next to the glue (or otherwise in thermal contact with the glue). For example, the heat source may be embedded in one or more (e.g., all) of the component surfaces that are glued. The heat source may be activated externally or internally, and thus allowing for fast curing in the assembly phase as well as easy disassembly without damaging the glued components (or components in thermal contact with the glue and/or the embedded heat source). By contrast, some solutions may utilize external heat and/or mechanical force to make the glue release, and both of these methods can severely damage one or more components. The damage can be in the form of heat related damage, where components are exposed to temperatures above their rated limit, or mechanical damage due to applied force to open a case and/or separate glued components.

In various embodiments, techniques discussed herein may be applied to different computing systems (such as those discussed with reference to FIGS. 5-8), including mobile computing device(s) (for example, a smartphone, tablet, UMPC (Ultra-Mobile Personal Computer), laptop computer, Ultrabook™ computing device, wearable device (such as a smart watch, smart glasses, a smart bracelet, and the like), etc., and/or non-mobile computing devices including a desktop computer, workstation, computer server (such as a blade server), all-in-one computing device, etc.

FIG. 1 illustrates a top view of a tablet device according to an embodiment. As previously mentioned, embodiments discussed herein are not limited to tablets and may applied to different types of computing systems (such as those discussed with reference to FIGS. 5-8), including mobile computing device(s) (for example, a smartphone, UMPC (Ultra-Mobile Personal Computer), laptop computer, Ultrabook™ computing device, wearable device (such as a smart watch, smart glasses, a smart bracelet, and the like), etc., and/or non-mobile computing devices including a desktop computer, workstation, computer server (such as a blade server), all-in-one device, etc.

Furthermore, as discussed above, an embodiment embeds a heat source in glue or next to the glue (or otherwise in thermal contact with the glue), where the glue is used to bond various components. For example, the heat source may be embedded in one or more (e.g., all) of the component surfaces that are glued. The heat source may be activated externally or internally, and thus allowing for fast curing in the assembly phase as well as easy disassembly without damaging the glued components (or components in thermal contact with the glue and/or the embedded heat source).

Referring to FIG. 1, a simplified tablet design seen from the front of the display and cover glass is shown. The black line that runs along the edges of the device is showing where the heating cable/element 102 could be located in this particular design. In one embodiment, the cover lens or glass 104 will have printed ink around the edges; hence, the heating cable 102 will not be visible to the user. Moreover, power input 106 (and/or heating element 102) may be accessible through a small latch or opening, such as an existing port (e.g., USB (Universal Serial Bus) port, audio port, SIM (Subscriber Identity Module), HDMI (High Definition Multimedia Interface), etc.), e.g., which has been modified to include this feature.

In an embodiment, the heating element/cable 102 may be any type of cable that is capable of sustaining a sufficient amount of heat or temperature (and/or for a sufficient duration) to sufficiently heat the layer of adhesive/glue to allow the glue to release its bond between the components that the glue attaches together. The heating element/cable 102 may be heated by applying electrical voltage (and/or electrical current) to the element 102. The release of the glue allows the glue/adhesive to either be replaced or be reused in various embodiments. In an embodiment, the power input 106 may be provided by an electromagnetic resonator (not shown) to wirelessly transfer electromagnetic energy to the heating element/cable 102.

As an example, the heating element/cable 102 may be constructed with one or more of the following material: Nichrome (Nickel Chromium alloy), Constantan® (Copper Nickel alloy), Kanthal® (Iron-Chromium-Aluminum alloy), and combinations thereof (e.g., where the heating element may include different portions consisting of different material such as the aforementioned material), or alloys thereof. In some embodiments, the heating element 102 may be a single strand cable or a multi-strand cable (e.g., including plurality of strands of the same or different material (such as those mentioned above) that are twisted together or otherwise bonded).

Figure 2A:
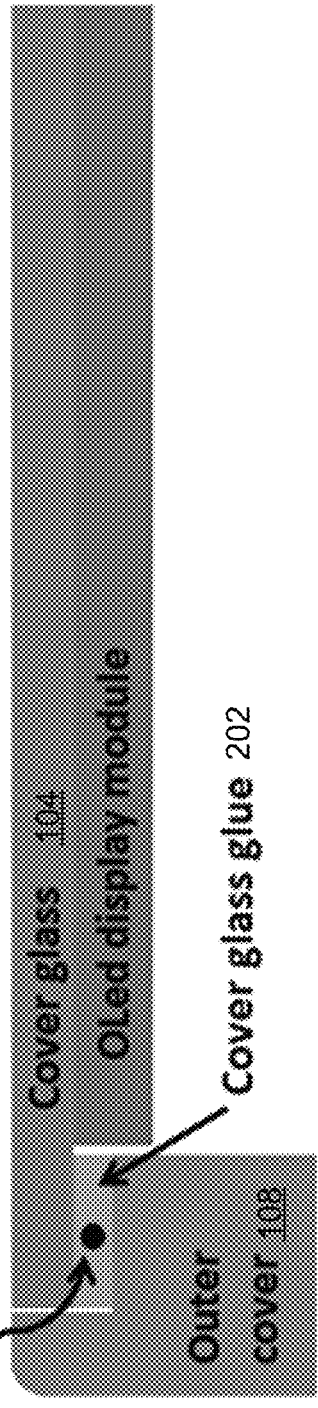
FIGS. 2A and 2B illustrated cross-sectional views of mechanical structures, according to some embodiments.
Figure 2B:
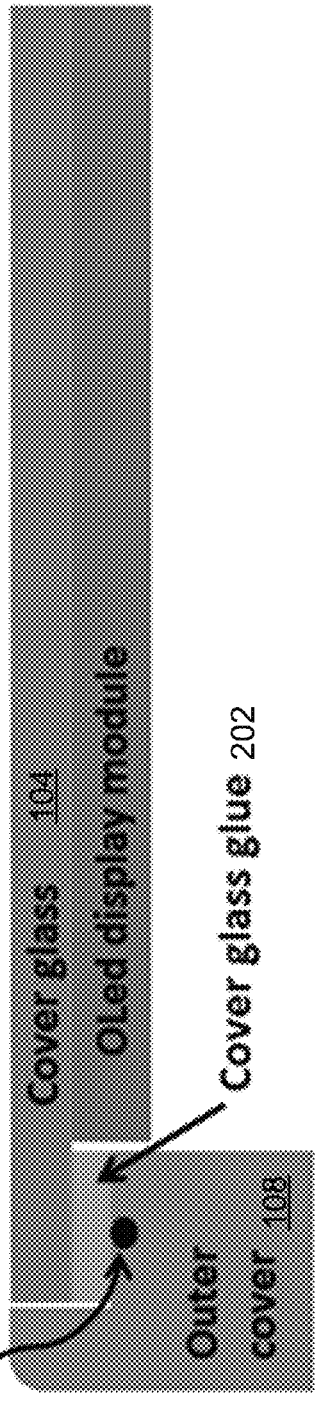

FIGS. 2A and 2B illustrated cross-sectional views of mechanical structures, according to some embodiments. More particularly, FIG. 2A shows the heating element 102 can be molded into the glue 202. And, FIG. 2B shows the heating element 102 can be molded into the mechanics, such as outer cover 108 (e.g., illustrated in FIGS. 1 and 2A-2B). However, these two methods of FIGS. 2A and 2 are not the only ways of implementing the embodiments. For example, the heater cable could also be designed onto the glass structure (e.g., cover glass 104) with some printing method (such as ITO or Indium Tin Oxide) in some embodiments.

Figure 3:
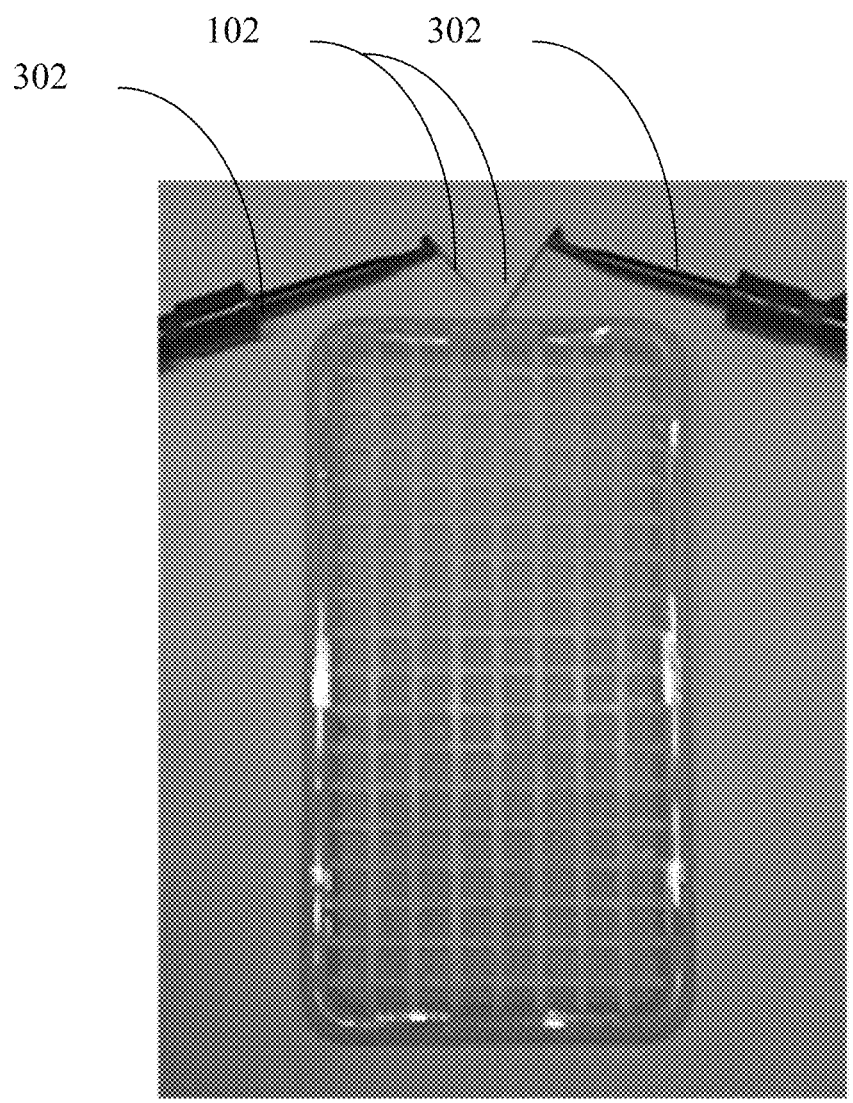
FIG. 3 illustrates a mechanical part with thermal cable embedded in a sample component, according to an embodiment.
Figure 4:
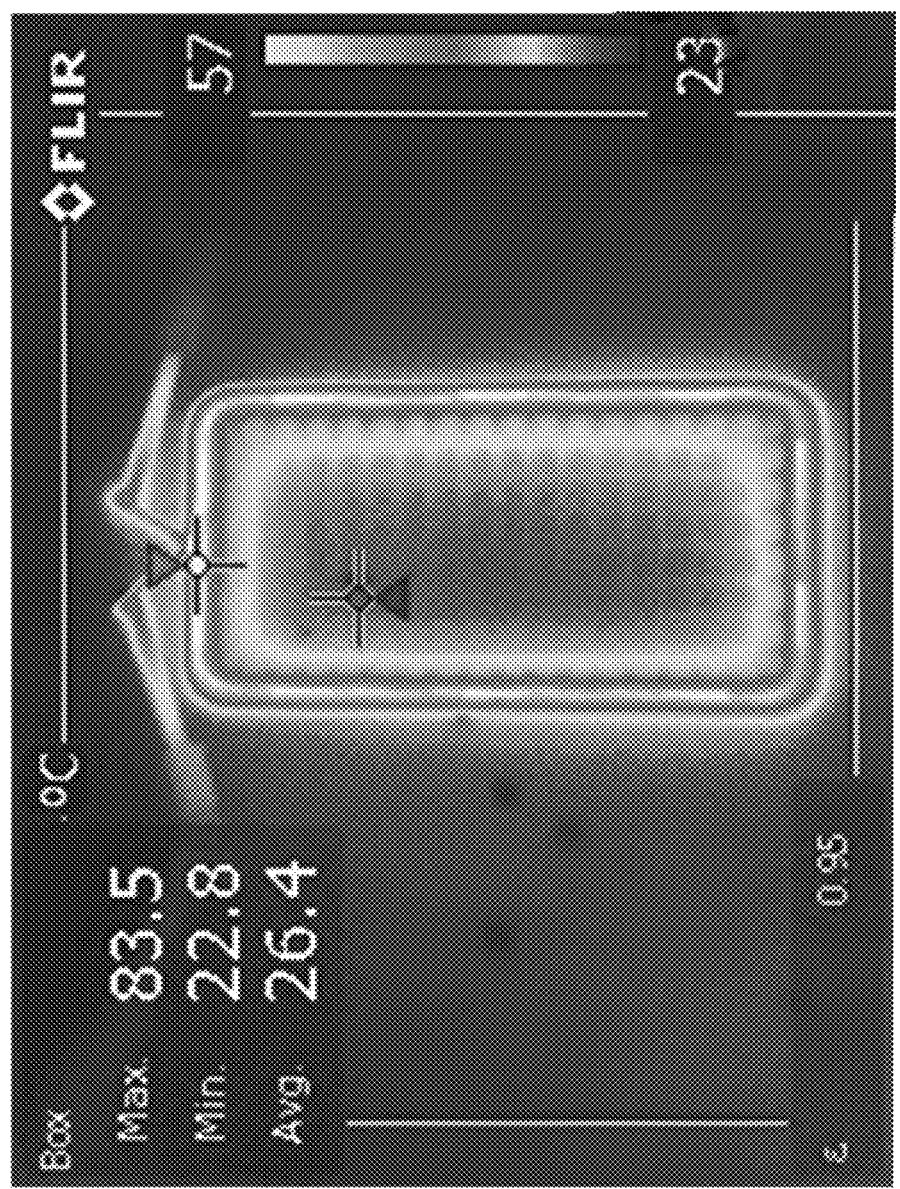
FIG. 4 illustrates a thermal image of the component of FIG. 3, according to an embodiment.

FIG. 3 illustrates a mechanical part where the thermal cable 102 is embedded in a sample component, according to an embodiment. In an embodiment, about 1.5 A of current is applied (e.g., by probes 302) through the system for approximately 30 seconds. This results in a steep rise in temperature until it stabilized at about 80° C. as shown in the thermal image of FIG. 4 (illustrating a thermal image of the part of FIG. 3), according to an embodiment.

Moreover, after assembling a cover lens with Pressure Sensitive Adhesive (PSA) that is generally used in some portable computing devices, the lens becomes so firmly affixed that it is not safe to remove it with the possibility of destruction of the lens. However, after applying current to the thermal cable and waiting for about 30 seconds, it is possible to remove the lens with relative ease and without the risk of destruction.

Further, such embodiments may be applied any type of component that needs to be firmly fixed in place, but still provide the possibility of easy removal. To this end, some embodiments may be applied in the following areas: (1) portable electronics, such as displays, back covers, lenses, cover glasses, etc.; (2) automotive, such as windows, windshields, mirrors, etc. (3) labels/stickers/passes, such as security stickers on CDs (Compact Discs), parking passes, entry passes (e.g., park passes, access passes, etc.), etc.; (4) marine, such as hatches, portholes, etc.; (5) aerospace such as instrument panels, etc.; and/or (6) house construction, such as tiles, fixtures, etc.

Furthermore, by removing the need for an external heat source (and/or mechanical force), some embodiments improve the reusability of components as well as decrease the time needed for service. Furthermore, system development costs in general may be lowered as a result, since there is no need for expensive jigs and heaters, and components are not destroyed during disassembly. Such embodiments are envisioned to allow for less waste material, as well as introduce cost savings, by being able to reuse components at a higher rate than earlier. For example, a display module can be the most expensive component in a tablet device, which can now be reused after disassembly. Such embodiments may also have a high design value as they would eliminate the need for complicated designs and tools to allow for in-market serviceability.

Figure 5:
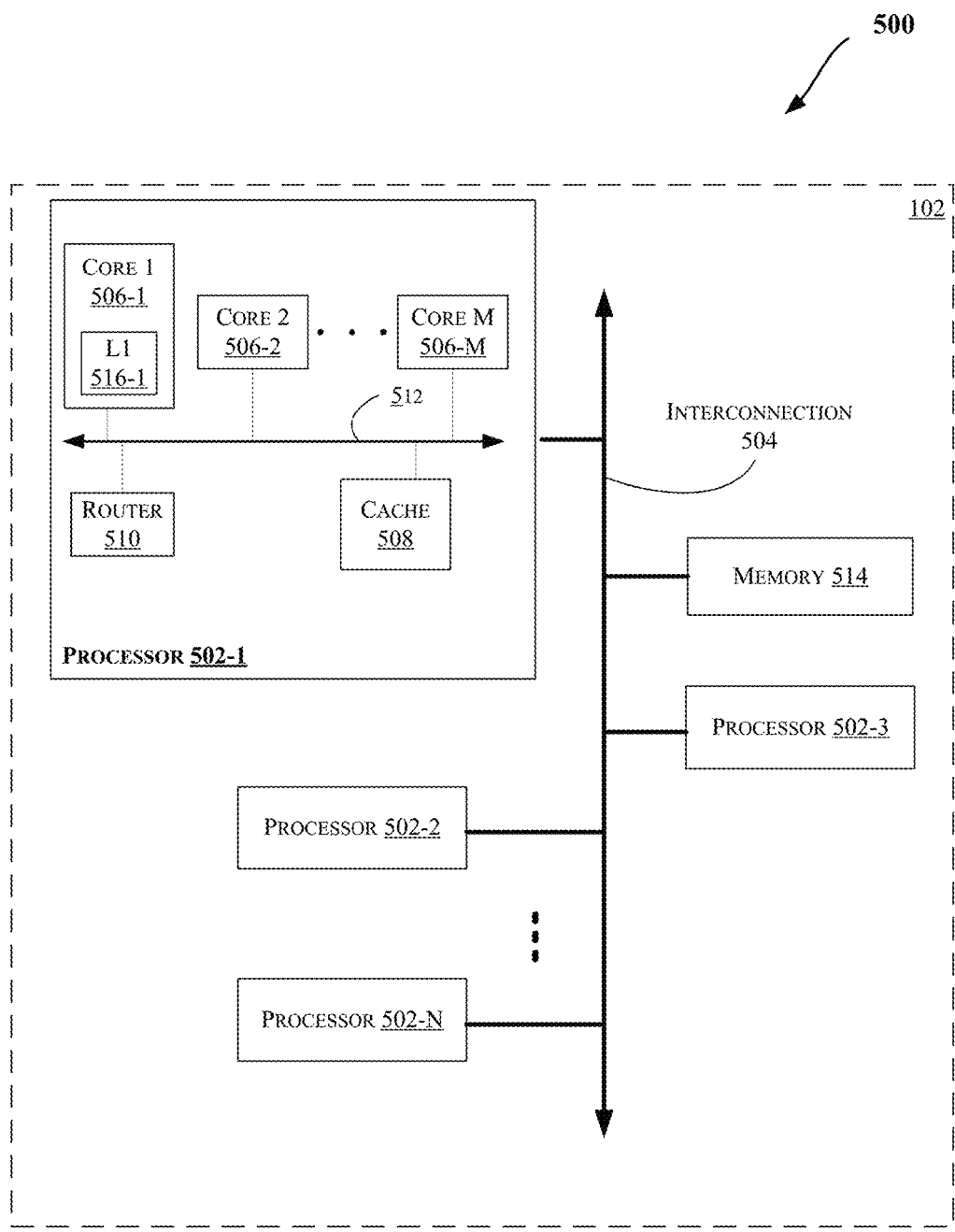
FIGS. 5-8 illustrate block diagrams of embodiments of computing systems, which may be utilized to implement various embodiments discussed herein.

Some embodiments may be applied in computing systems that include one or more processors (e.g., with one or more processor cores), such as those discussed with reference to FIGS. 5-8, including for example mobile computing devices such as a smartphone, tablet, UMPC (Ultra-Mobile Personal Computer), laptop computer, Ultrabook∩ computing device, wearable devices (such as smart watch, smart glasses, smart bracelets, and the like), etc. More particularly, FIG. 5 illustrates a block diagram of a computing system 500, according to an embodiment. As shown, system 500 may include the heating element/cable 102.

System 500 may include one or more processors 502-1 through 502-N (generally referred to herein as "processors 502" or "processor 502"). The processors 502 may be general-purpose CPUs (Central Processing Units) and/or GPUs (Graphics Processing Units) in various embodiments. The processors 502 may communicate via an interconnection or bus 504. Each processor may include various components some of which are only discussed with reference to processor 502-1 for clarity. Accordingly, each of the remaining processors 502-2 through 502-N may include the same or similar components discussed with reference to the processor 502-1.

In an embodiment, the processor 502-1 may include one or more processor cores 506-1 through 506-M (referred to herein as "cores 506," or "core 506"), a cache 508, and/or a router 510. The processor cores 506 may be implemented on a single integrated circuit (IC) chip. Moreover, the chip may include one or more shared and/or private caches (such as cache 508), buses or interconnections (such as a bus or interconnection 512), graphics and/or memory controllers (such as those discussed with reference to FIGS. 6-8), or other components.

In one embodiment, the router 510 may be used to communicate between various components of the processor 502-1 and/or system 500. Moreover, the processor 502-1 may include more than one router 510. Furthermore, the multitude of routers 510 may be in communication to enable data routing between various components inside or outside of the processor 502-1.

The cache 508 may store data (e.g., including instructions) that are utilized by one or more components of the processor 502-1, such as the cores 506. For example, the cache 508 may locally cache data stored in a memory 514 for faster access by the components of the processor 502 (e.g., faster access by cores 506). As shown in FIG. 5, the memory 514 may communicate with the processors 502 via the interconnection 504. In an embodiment, the cache 508 (that may be shared) may be a mid-level cache (MLC), a last level cache (LLC), etc. Also, each of the cores 506 may include a Level 1 (L1) cache (516-1) (generally referred to herein as "L1 cache 516") or other levels of cache such as a Level 2 (L2) cache. Moreover, various components of the processor 502-1 may communicate with the cache 508 directly, through a bus (e.g., the bus 512), and/or a memory controller or hub.

Figure 6:
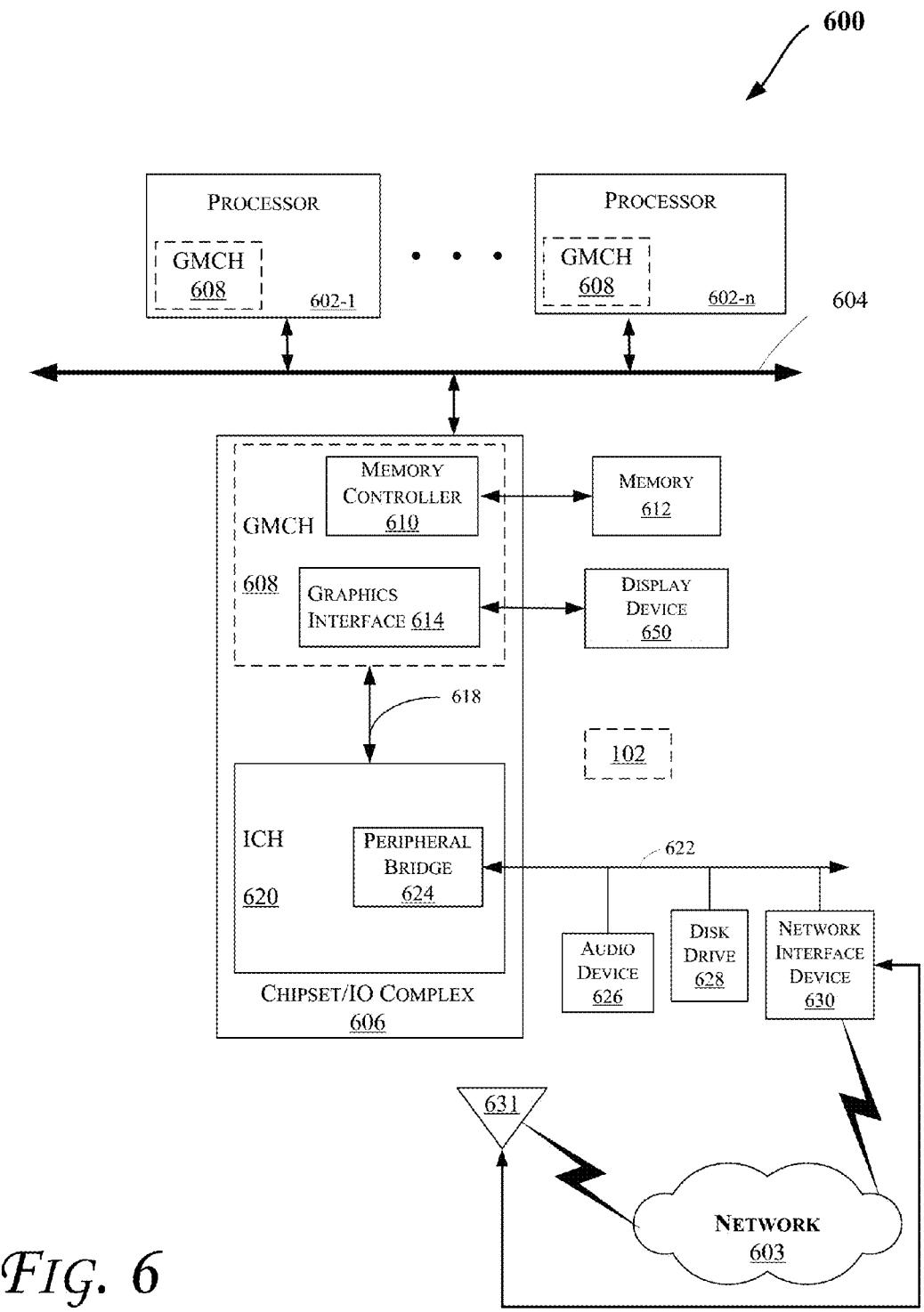

FIG. 6 illustrates a block diagram of a computing system 600 in accordance with an embodiment. As shown, system 600 may include the cable/element 102. Computing system 600 may include one or more Central Processing Units (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)).

Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 502 of FIG. 5. Also, the operations discussed with reference to FIGS. 1-5 may be performed by one or more components of the system 600.

A chipset 606 may also communicate with the interconnection network 604. The chipset 606 may include a graphics memory control hub (GMCH) 608, which may be located in various components of system 600 (such as those shown in FIG. 6). The GMCH 608 may include a memory controller 610 that communicates with a memory 612 (which may be the same or similar to the memory 514 of FIG. 5). The memory 612 may store data, including sequences of instructions, that may be executed by the CPU 602, or any other device included in the computing system 600. In one embodiment, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The GMCH 608 may also include a graphics interface 614 that communicates with a display device 650. In one embodiment, the graphics interface 614 may communicate with the display device 650 via an accelerated graphics port (AGP) or Peripheral Component Interconnect (PCI) (or PCI express (PCIe) interface). In an embodiment, the display (such as a flat panel display) may communicate with the graphics interface 614 through, for example, a signal converter that translates a digital representation of an image stored in a storage device such as video memory or system memory into display signals that are interpreted and displayed by the display device. The display signals produced by the display device may pass through various control devices before being interpreted by and subsequently displayed on the display device 650.

A hub interface 618 may allow the GMCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. As shown, the network interface device 630 may be coupled to an antenna 631 to wirelessly (e.g., via an Institute of Electrical and Electronics Engineers (IEEE) 802.11 interface (including IEEE 802.11a/b/g/n/ac, etc.), cellular interface, including 3G (third generation), 4G (fourth generation), LPE (Low Power Embedded) interfaces, etc.) communicate with the network 603. Other devices may communicate via the bus 622. Also, various components (such as the network interface device 630) may communicate with the GMCH 608. In addition, the processor 602 and the GMCH 608 may be combined to form a single chip. Furthermore, a graphics accelerator may be included within the GMCH 608 in other embodiments.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
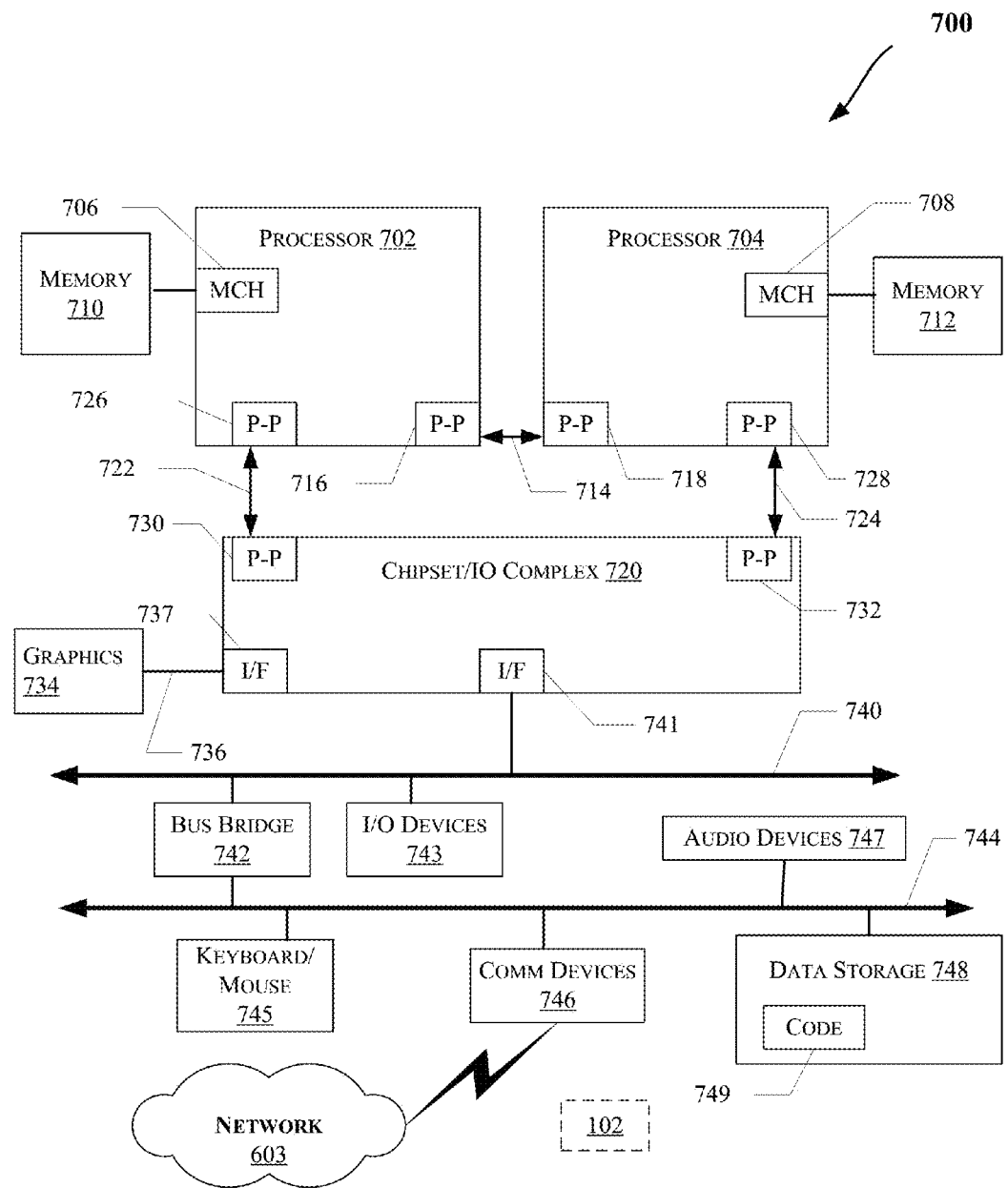

FIG. 7 illustrates a computing system 700 that is arranged in a point-to-point (PtP) configuration, according to an embodiment. In particular, FIG. 7 shows a system where processors, memory, and input/output devices are interconnected by a number of point-to-point interfaces. The operations discussed with reference to FIGS. 1-6 may be performed by one or more components of the system 700. As shown, system 700 may include the cable/element 102.

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712. The memories 710 and/or 712 may store various data such as those discussed with reference to the memory 612 of FIG. 6.

In an embodiment, the processors 702 and 704 may be one of the processors 602 discussed with reference to FIG. 6. The processors 702 and 704 may exchange data via a point-to-point (PtP) interface 714 using PtP interface circuits 716 and 718, respectively. Also, the processors 702 and 704 may each exchange data with a chipset 720 via individual PtP interfaces 722 and 724 using point-to-point interface circuits 726, 728, 730, and 732. The chipset 720 may further exchange data with a graphics circuit 734 via a graphics interface 736, e.g., using a PtP interface circuit 737.

The chipset 720 may communicate with a bus 740 using a PtP interface circuit 741. The bus 740 may communicate with one or more devices, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 603), audio I/O device 747, and/or a data storage device 748. The data storage device 748 may store code 749 that may be executed by the processors 702 and/or 704.

Figure 8:
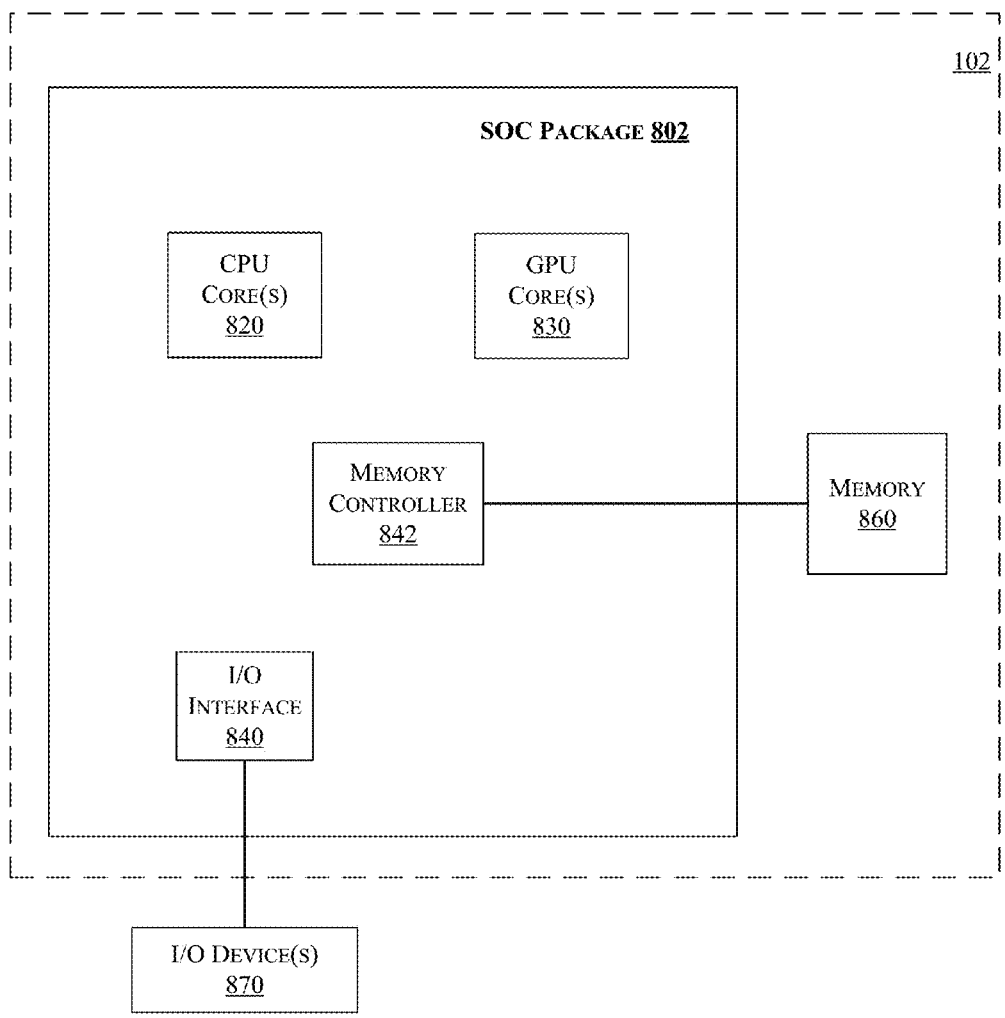

In some embodiments, one or more of the components discussed herein can be embodied as a System On Chip (SOC) device. FIG. 8 illustrates a block diagram of an SOC package in accordance with an embodiment. As illustrated in FIG. 8, SOC 802 includes one or more Central Processing Unit (CPU) cores 820, one or more Graphics Processing Unit (GPU) cores 830, an Input/Output (I/O) interface 840, and a memory controller 842. Various components of the SOC package 802 may be coupled to an interconnect or bus such as discussed herein with reference to the other figures. Also, the SOC package 802 may include more or less components, such as those discussed herein with reference to the other figures. Further, each component of the SOC package 820 may include one or more other components, e.g., as discussed with reference to the other figures herein. In one embodiment, SOC package 802 (and its components) is provided on one or more Integrated Circuit (IC) die, e.g., which are packaged into a single semiconductor device.

As illustrated in FIG. 8, SOC package 802 is coupled to a memory 860 (which may be similar to or the same as memory discussed herein with reference to the other figures) via the memory controller 842. In an embodiment, the memory 860 (or a portion of it) can be integrated on the SOC package 802.

The I/O interface 840 may be coupled to one or more I/O devices 870, e.g., via an interconnect and/or bus such as discussed herein with reference to other figures. I/O device (s) 870 may include one or more of a keyboard, a mouse, a touchpad, a display device, an image/video capture device (such as a camera or camcorder/video recorder), a touch screen, a speaker, or the like. Furthermore, as shown, the system of FIG. 8 may include the heating element/cable 102.

Moreover, the scenes, images, or frames discussed herein (e.g., which may be processed by the graphics logic in various embodiments) may be captured by an image capture device (such as a digital camera (that may be embedded in another device such as a smart phone, a tablet, a laptop, a stand-alone camera, etc.) or an analog device whose captured images are subsequently converted to digital form). Moreover, the image capture device may be capable of capturing multiple frames in an embodiment. Further, one or more of the frames in the scene are designed/generated on a computer in some embodiments. Also, one or more of the frames of the scene may be presented via a display (such as the display discussed with reference to FIGS. 6 and/or 7, including for example a flat panel display device, etc.).

The following examples pertain to further embodiments. Example 1 includes 1 includes an apparatus comprising: a heating element thermally coupled to an adhesive, wherein the adhesive is to bond a first portion of a computing device and a second portion of the computing device, wherein the heating element is capable to be heated in response to application of power, wherein the heated heating element is to cause release of a bond by the adhesive to allow for physical separation of the first portion of the computing device and the second portion of the computing device. Example 2 includes the apparatus of example 1, wherein the application of power is to be provided through one or more of: application of electrical voltage, application of electric current, or application of electromagnetic energy. Example 3 includes the apparatus of example 1, wherein the heating element is to be accessible through a latch or an opening. Example 4 includes the apparatus of example 3, wherein the opening is an existing port of the computing device. Example 5 includes the apparatus of example 4, wherein the existing port is selected from a group comprising: a USB (Universal Serial Bus) port, an audio port, a SIM (Subscriber Identity Module) port, or an HDMI (High Definition Multimedia Interface) port. Example 6 includes the apparatus of example 1, wherein the heating element is to be constructed of material selected from a group comprising one or more of: Nickel Chromium alloy, Copper Nickel alloy, Iron-Chromium-Aluminum alloy, and/or combinations thereof. Example 7 includes the apparatus of example 1, wherein the heating element is to comprise a single strand cable or a multi-strand cable. Example 8 includes the apparatus of example 7, wherein the multi-strand cable is to be constructed with a plurality of cable material. Example 9 includes the apparatus of example 1, wherein the heating element is capable of sustaining a sufficient amount of heat or temperature for a sufficient duration to release the bond by the adhesive. Example 10 includes the apparatus of example 1, wherein the first portion of the computing device is to comprise a display device or a display device cover glass. Example 11 includes the apparatus of example 10, wherein the display device is to comprise a flat panel display. Example 12 includes the apparatus of example 1, wherein the second portion of the computing device is to comprise a device chassis of the computing device or an outer cover of the computing device. Example 13 includes the apparatus of example 1, wherein the computing device is to comprise a mobile computing device. Example 14 includes the apparatus of example 13, wherein the mobile computing device is to comprise one or more of: a System On Chip (SOC) device; a processor, having one or more processor cores; a flat panel display device, and memory. Example 15 includes the apparatus of example 14, wherein the mobile computing device is to comprise one of: a smartphone, tablet, UMPC (Ultra-Mobile Personal Computer), laptop computer, Ultrabook™ computing device, and a wearable device. Example 16 includes the apparatus of example 15, wherein the wearable device is to comprise one of a smart watch, smart glasses, or a smart bracelet.

Example 17 includes a computing system comprising: a processor having one or more processor cores; a flat panel display device coupled to the processor; a heating element thermally coupled to an adhesive, wherein the adhesive is to bond a cover glass of the flat panel display device to an outer cover, wherein the heating element is capable to be heated in response to application of power, wherein the heated heating element is to cause release of a bond by the adhesive to allow for physical separation of the cover glass and outer cover. Example 18 includes the system of example 17, wherein the application of power is to be provided through one or more of: application of electrical voltage, application of electric current, or application of electromagnetic energy.

Example 19 includes the system of example 17, wherein the heating element is to be accessible through a latch or an opening. Example 20 includes the system of example 19, wherein the opening is an existing port. Example 21 includes the system of example 20, wherein the existing port is selected from a group comprising: a USB (Universal Serial Bus) port, an audio port, a SIM (Subscriber Identity Module) port, or an HDMI (High Definition Multimedia Interface) port. Example 22 includes the system of example 17, wherein the heating element is to be constructed of material selected from a group comprising one or more of: Nickel Chromium alloy, Copper Nickel alloy, Iron-Chromium-Aluminum alloy, and/or combinations thereof. Example 23 includes the system of example 17, wherein the heating element is to comprise a single strand cable or a multi-strand cable. Example 24 includes the system of example 17, wherein the heating element is capable of sustaining a sufficient amount of heat or temperature for a sufficient duration to release the bond by the adhesive. Example 25 includes the system of example 17, further comprising memory to be accessible by the processor, wherein the flat panel display device is to display one or more images corresponding to at least some data stored in the memory.

Example 26 includes a method comprising: applying power to a heating element thermally coupled to an adhesive, wherein the adhesive bonds a first portion of a computing device and a second portion of the computing device, wherein the heated heating element causes release of a bond by the adhesive to allow for physical separation of the first portion of the computing device and the second portion of the computing device. Example 27 includes the method of example 26, wherein the application of power is performed through one or more of: application of electrical voltage, application of electric current, or application of electromagnetic energy. Example 28 includes the method of example 26, wherein the heating element is accessible through a latch or an opening. Example 29 includes the method of example 28, wherein the opening is an existing port of the computing device.

Example 30 includes an apparatus comprising means to perform a method as set forth in any preceding example.

In various embodiments, the operations discussed herein, e.g., with reference to FIGS. 1-8, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-8.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a heating element thermally coupled to an adhesive, wherein the adhesive is to bond a first portion of a computing device and a second portion of the computing device,
wherein the heating element is capable to be heated in response to application of power, wherein the heated heating element is to cause release of a bond by the adhesive to allow for physical separation of the first portion of the computing device and the second portion of the computing device, wherein the heating element is to be accessible through an opening, wherein the opening is an existing port of the computing device.

2. The apparatus of claim 1, wherein the application of power is to be provided through one or more of: application of electrical voltage, application of electric current, or application of electromagnetic energy.

3. The apparatus of claim 1, wherein the heating element is to be further accessible through a latch.

4. The apparatus of claim 1, wherein the existing port is selected from a group comprising: a USB (Universal Serial Bus) port, an audio port, a SIM (Subscriber Identity Module) port, or an HDMI (High Definition Multimedia Interface) port.

5. The apparatus of claim 1, wherein the heating element is to be constructed of material selected from a group comprising one or more of: Nickel Chromium alloy, Copper Nickel alloy, Iron-Chromium-Aluminum alloy, and/or combinations thereof.

6. The apparatus of claim 1, wherein the heating element is to comprise a single strand cable or a multi-strand cable.

7. The apparatus of claim 6, wherein the multi-strand cable is to be constructed with a plurality of cable material.

8. The apparatus of claim 1, wherein the heating element is capable of sustaining a sufficient amount of heat or temperature for a sufficient duration to release the bond by the adhesive.

9. The apparatus of claim 1, wherein the first portion of the computing device is to comprise a display device or a display device cover glass.

10. The apparatus of claim 9, wherein the display device is to comprise a flat panel display.

11. The apparatus of claim 1, wherein the second portion of the computing device is to comprise a device chassis of the computing device or an outer cover of the computing device.

12. The apparatus of claim 1, wherein the computing device is to comprise a mobile computing device.

13. The apparatus of claim 12, wherein the mobile computing device is to comprise one or more of: a System On Chip (SOC) device; a processor, having one or more processor cores; a flat panel display device, and memory.

14. The apparatus of claim 13, wherein the mobile computing device is to comprise one of: a smartphone, tablet, UMPC (Ultra-Mobile Personal Computer), laptop computer, Ultrabook™ computing device, and a wearable device.

15. The apparatus of claim 14, wherein the wearable device is to comprise one of a smart watch, smart glasses, or a smart bracelet.

16. A computing system comprising:
a processor having one or more processor cores;
a flat panel display device coupled to the processor;
a heating element thermally coupled to an adhesive, wherein the adhesive is to bond a cover glass of the flat panel display device to an outer cover,
wherein the heating element is capable to be heated in response to application of power, wherein the heated heating element is to cause release of a bond by the adhesive to allow for physical separation of the cover glass and outer cover, wherein the heating element is to be accessible through an opening, wherein the opening is an existing port of the computing device.

17. The system of claim 16, wherein the application of power is to be provided through one or more of: application of electrical voltage, application of electric current, or application of electromagnetic energy.

18. The system of claim 16, wherein the heating element is to be further accessible through a latch.

19. The system of claim 16, wherein the existing port is selected from a group comprising: a USB (Universal Serial Bus) port, an audio port, a SIM (Subscriber Identity Module) port, or an HDMI (High Definition Multimedia Interface) port.

20. The system of claim 16, wherein the heating element is to be constructed of material selected from a group comprising one or more of: Nickel Chromium alloy, Copper Nickel alloy, Iron-Chromium-Aluminum alloy, and/or combinations thereof.

21. The system of claim 16, wherein the heating element is to comprise a single strand cable or a multi-strand cable.

22. The system of claim 16, wherein the heating element is capable of sustaining a sufficient amount of heat or temperature for a sufficient duration to release the bond by the adhesive.

23. The system of claim 16, further comprising memory to be accessible by the processor, wherein the flat panel display device is to display one or more images corresponding to at least some data stored in the memory.

\* \* \* \* \*